April 12, 1966 W. A. ROWLETT 3,245,706
COMBINATION BEARING AND JOINT
Filed May 6, 1965 2 Sheets-Sheet 1

WILLARD A. ROWLETT
INVENTOR.

BY
Robert K. Rhea
AGENT

WILLARD A. ROWLETT
*INVENTOR*

BY

*Robert K. Rhea*
AGENT

United States Patent Office 3,245,706
Patented Apr. 12, 1966

3,245,706
COMBINATION BEARING AND JOINT
Willard A. Rowlett, P.O. Box 14-W,
Oklahoma City, Okla. 73123
Filed May 6, 1965, Ser. No. 453,760
6 Claims. (Cl. 287—90)

This invention relates to suspension devices for motor vehicles and more particularly it relates to a ball joint of the type commonly used in the steering linkage and front suspension of motor vehicles.

Ball joint suspension assemblies as heretofore available have in general a common fault; namely, a certain degree of looseness of fit between the housing or socket and the ball forming the joint. This looseness is occasioned during the manufacturing of the component parts of the joints in that when the housing which is formed of two units, one being a stamping and the other a machine and heat-treated unit, is assembled the tolerance of desired fit cannot be kept to the desired minimum. Therefore, in all such assemblies some such looseness is present which may amount to $\frac{1}{16}$ of an inch or more between mating parts. Even new automobiles using such wheel suspension connections have been found to have undesired looseness of fit. At these critical points an accurate, snug-fitting connection is imperative in front wheel suspension to eliminate excessive tire wear by continual caster and camber changes; to prevent road wander of the vehicle; to eliminate front wheel shimmy at speeds from 50 to 60 miles per hour on curves; and, to eliminate canting of the front wheels.

In an attempt to aleviate the foregoing objections due to a loose fit it has been proposed to provide a helical tapered spring adapted to surround a shank of a ball joint stud between its connection with a wheel steering knuckle and the ball joint housing connected to the distal end of a load supporting arm. A retaining member supports one end of the spring on the outer surface of the ball joint housing while a washer-like seat in contact with the wheel steering knuckle nests the opposing end of the spring.

Various other means have also been proposed to overcome the foregoing deficiency, but none, to the best of my knowledge, have been entirely satisfactory. As one disadvantage the member in contact with the outer surface of the ball joint housing must be treated in some manner to prevent "galling."

It is, therefore, the principal object of the present invention to provide a ball joint suspension unit that obviates the disadvantages of the prior art of this character.

It is another object of my invention to provide a ball joint replacement unit that will when installed maintain a uniform tension on the components of the joint assembly at all times.

Another object is to provide a ball joint that will when installed maintain a predetermined aligned position of a vehicle steering and suspension system under all driving conditions and yet permit freedom of movement as required.

Another object is to provide a ball joint that will when installed operate in the manner of a shock absorber which is self adjusting throughout its life and will require a minimum of attention following its installation.

Still another object is to provide a ball joint that can be easily and economically manufactured.

Yet another object is to provide a complete ball joint assembly which may be easily installed as a replacement unit for the original ball joint.

The present invention accomplishes these and other objects by positioning one end of an oscillating stud member within a hollow housing wherein resilient members maintain bearing surfaces in contact with the inner walls of the housing.

Other objects will be apparent from the following description when taken in conjunction with the accompanying two sheets of drawings, wherein.

Like characters of reference designate like parts in those figures of the drawings in which they occur.

In the drawings.

Figure 1:
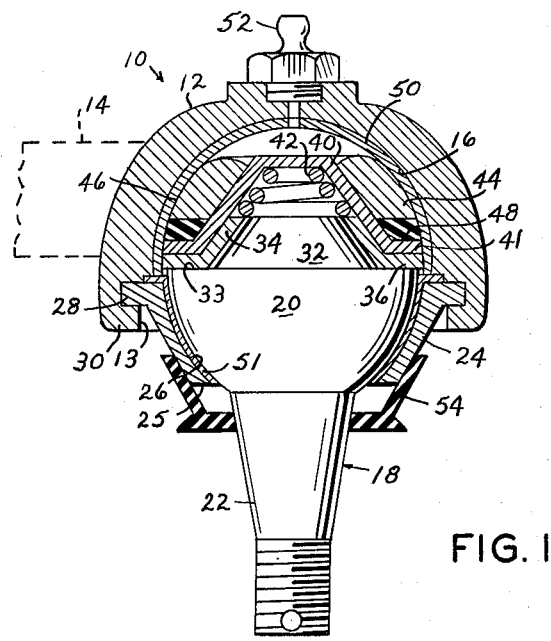
FIGURE 1 is a vertical cross-sectional view, partially in elevation, of one embodiment of the invention.

The reference numeral 10 indicates the ball joint, as a whole, comprising a housing 12 rigidly secured to an arm or supporting structure 14 of a vehicle. The housing 12 has an opening 13 and is provided with an inner substantially hemispherical bearing surface 16 which cooperatingly nests components of the joint as hereinafter described.

An oscillating stud member 18, having a substantially hemispherical ball portion 20, is positioned within the housing. The stud 18 is provided with an integral tapered and threaded shank portion 22 which projects out through the opening 13. The ball portion 20 is held within the joint 10 by a frusto-conical shaped housing cap or closing member 24 having a shank receiving opening 25 and having an inner surface 26, contiguously contacting the outer hemispherical surface of the ball portion 20. The wall forming the opening 13 of the housing 12 is rolled over an annular flange 28 formed on the member 24, as at 30, to maintain the joint in assembled relation. The inwardly disposed end of the ball portion 20 is provided with a central frusto-conical shaped portion 32 of less diameter than the diameter of the ball portion 20 and defines an annular shoulder 33. A frusto-conical shaped first ring 34, having opposing substantially parallel surfaces surrounds and contiguously contacts the inclined wall of the ball end portion 32. The ring 34 is characterized by an outstanding flange 36 which bears against and is diametrically substantially equal to the annular shoulder 33 of the ball end portion.

Figure 5:
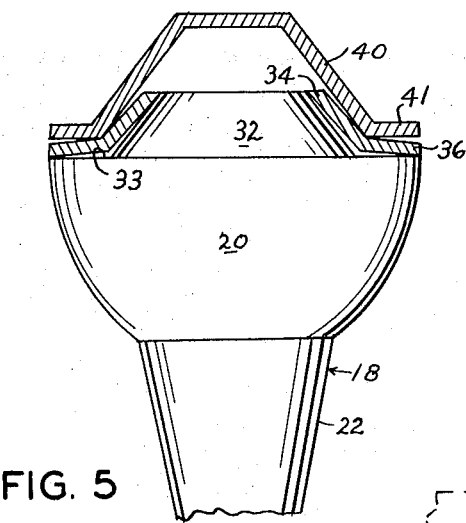

As shown in FIG. 5, the planes forming the respective opposing parallel surfaces of the member 34 mis-mate with the planes forming the shoulder 33 and conical shape 32 of the stud. A second frusto-conical similarly shaped cap ring or member 40 is superposed on the member 34.

The truncated end portion of the cap ring member 40 extends beyond the truncated end of the cone 32 and ring 34. The tapered or conical wall of the member 40 is formed in a greater conical plane generated around the wall of the conical portion 32 a distance equal to the thickness of the ring 34. The cap ring 40 has an annular flange 41 parallel with and diametrically substantially equal to the annular shoulder 33.

A spiral spring 42 is positioned within the second member 40 and bears against the truncated end of the member 34. A segmental seat or split bearing 44, having one cooperating surface contiguously contacting the outer conical surface of the cap ring member 40 and having an arcuate outer surface 46, is disposed around the cap ring 40. A ring 48 of resilient material is interposed between the split bearing 44 and annular flange 41. A hemispherically shaped seat 50 contiguously contacts the hemispherical inner surface 16 and the outwardly disposed surfaces of the flanges 36, 41, ring 48 and a portion of the split bearing surface 46. An anti-friction shield 51 is interposed between the ball portion 20 and the inner surface 26 of the housing cap 24.

A grease gun fitting 52 is connected with the housing 10 opposite the shank 22. A grease retaining and sealing member 54 surrounds the shank 22 in contact with the closing member 24. When the housing cap 24 is connected to the housing 12, the ball stud 18 and its components are forced together under pressure great enough to force the mis-mating planes of the ring 34 into contact with the adjacent surfaces of the cone 32, shoulder 33 and adjacent surfaces of the cap ring 40 and to compress the spring 42.

Figure 2:
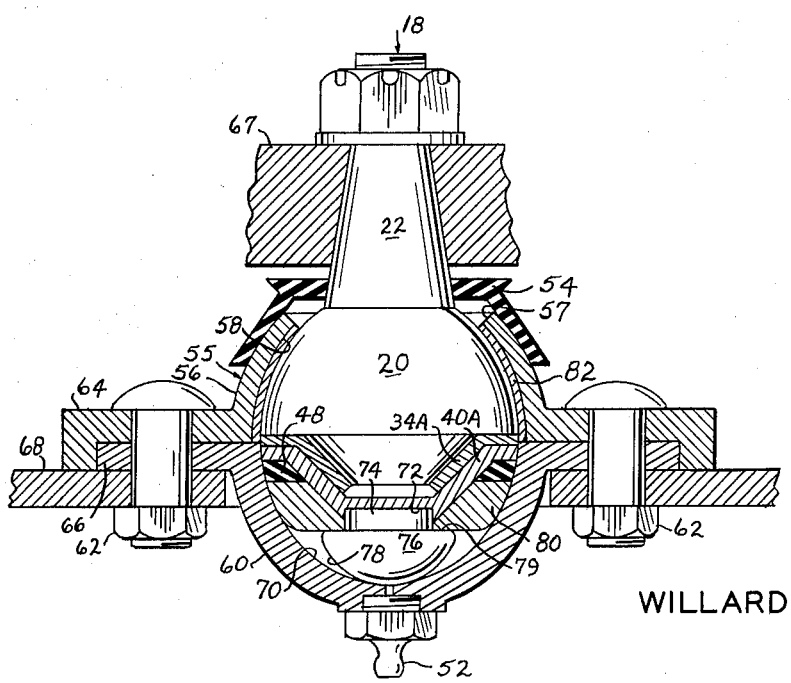
FIGURE 2 is a view similar to FIG. 1 illustrating an alternative arrangement of the components of the joint and illustrating the manner in which it is connected with a vehicle.

Referring more particularly to FIG. 2, the stud member 18 is positioned within a horizontally divided housing 55. The upper half portion 56 of the housing has a shank receiving opening 57 and is provided with a substantially hemispherical inner ball stud engaging surface 58. The housing half portion 56 is secured to the opposite or lower half housing portion 60 by bolts and nuts 62 extending through respective flanges 64 and 66 of the housing. The bolts and nuts 62 connect the housing 55 to a supporting member 68 while the shank 22 extends through and is secured to a load arm 67. The lower housing portion 60 is similarly provided with an arcuate inner surface 70 cooperatively mating with the stud bearing member surface 58.

Similarly shaped members 34A and 40A are positioned on the inwardly disposed end portion of the stud member 18. The member 40A is provided with a recess 72 in its outermost closed end portion which receives a cylindrical shank portion 74 of a bearing 76. The end portion of the bearing 76, opposite its shank portion 74, is provided with a substantially hemispherical seat or outer surface 78, diametrically greater than the shank portion 74 forming a shoulder 79. The surface 78 slidably contacts the housing inner surface 70. Segmental bearing members 80, similar to the bearing 44 of FIG. 1, are interposed between the outer conical surface of the member 40A, the housing inner wall surface 70 and the annular shoulder 79 formed by the shank 74. The resilient ring 48 is similarly interposed between the bearing members 80 and the cap ring 40A. An antifriction sheath 82 is interposed between the ball portion 20 of the stud member and the inner wall surface 58. The shank 22 of the stud member 18 is sealed with the housing half 56 by the grease sealing member 54. The mis-mating surfaces of the member 34A, when forced into contact with the adjacent cooperating surfaces, maintain a constant pressure against the stud member 18 and bearing member 76 to maintain the joint components in a loaded condition at all times.

Figure 3:
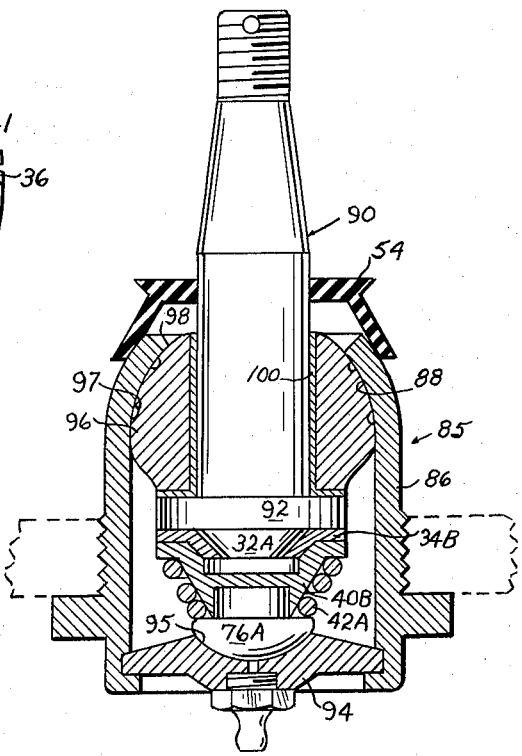
FIGURE 3 is a vertical cross-sectional view, partially in elevation, of an alternative ball joint.

Referring now to FIG. 3, the reference numeral 85 indicates a ball joint housing having a substantially cylindrical open ended body 86 with one end portion of the housing arcuately curved inwardly to form an inner substantially hemispherical bearing surface 88. A stud member 90 has one cylindrical end portion positioned within the housing 85 with its other outwardly projecting end portion tapered and threaded for connection with a load member. The inwardly disposed end of the stud member 90 is provided with an annular flange 92 defining a truncated cone end portion 32A. Members 34B and 40B, similar to the members 34A and 40A, respectively, are superposed on the inwardly disposed end portion of the stud member 90. The open end of the housing opposite the bearing surface 88 is closed by a cap or plug 94 in a manner similar to that described for connecting the member 24 to the housing 12 of FIG. 1 except that the cap 94 is provided with an arcuate seat 95 coaxial with respect to the longitudinal axis of the stud member 90. A bearing member 76A, similar to the bearing member 76, is interposed between the member 40B and the arcuate seat 85. An upper bearing member 96, having grease grooves or canals 97 formed in its outer surface, surrounds the cylindrical end portion of the stud 90 within the body 86 and bears against the bearing surface 88 and the adjacent surface of the flange 92. The bearing member 96 is provided with an arcuate outer surface 98 slidably contacting the housing surface 88 permitting oscillating movement of the stud member 90. A spiral spring 42A surrounds the conical outer surface of the member 40B and bears against the shoulder of the bearing 76A. Similarly, a sheath 100 is interposed between the bearing member 96 and the cylindrical portion and flange 92 of the stud member 90. The grease seal 54 similarly seals the open end of the housing around the stud member 90.

Figure 4:
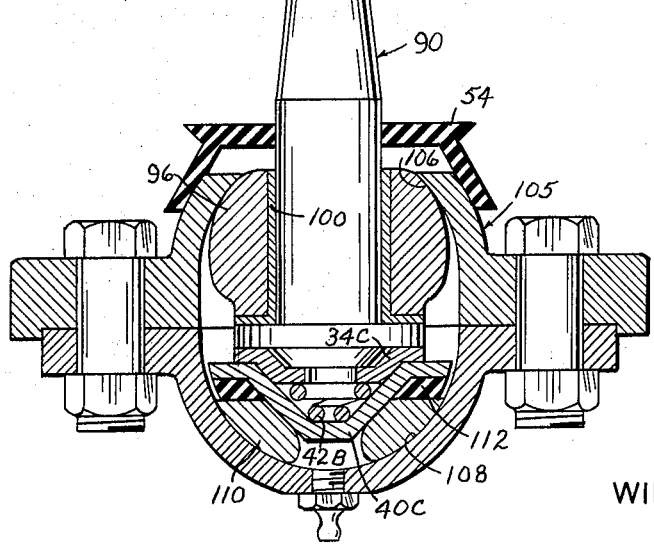
FIGURE 4 is a view similar to FIG. 3 illustrating another arrangement of the joint components; and, FIGURE 5 is a fragmentary elevational view of an oscillating stud member illustrating in cross section the manner of forming cooperating joint loading elements.

Referring more particularly to FIG. 4, the reference numeral 105 indicates a bolt connected horizontally divided ball joint housing having an open end in its upper half defined by a converging wall forming an inner arcuate surface 106 and having an opposing arcuate surface 108 formed in its other or lower half portion. Similarly, the stud member 90 is positioned within the housing 105 with the bearing members 96 and sheath 100. The bearing 96 contacts the upper housing half inner surface 106. Members 34C and 40C, substantially corresponding in shape to the members 34 and 40 of FIG. 1, are positioned on the inwardly disposed end of the stud member 90. A spiral spring 42B is interposed between the inner surfaces of the member 40C and the adjacent end portion of the member 34C. A bearing member 110, similar to the bearing 44, is interposed between the member 40C and inner surface 108 of the lower half of the housing 105. A resilient ring 112, similar to the ring 48, is interposed between the flanged portion of the member 40C and the bearing member 110. The stud member 90 is similarly sealed with the housing by the grease seal 54.

Obviously the invention is susceptible to some change or alteration without defeating its practicability, and I therefore do not wish to be confined to the preferred embodiment shown in the drawings and described herein, further than I am limited by the scope of the appended claims.

I claim:

1. A ball joint assembly for connecting a load bearing member to the distal end of a load supporting arm, comprising: a hollow housing having an opening at one end and having an arcuate inner surface opposite and adjacent the opening; a stud having an enlarged head end portion disposed within said housing and having a shank end portion projecting outwardly through the opening, the end of said head end portion opposite said shank end portion having a diametric planar end surface intersected by a truncated conical surface portion extending therefrom; a pair of superposed, annular, truncated conical members each having an annular flange overlying and extending about the diametric and truncated conical surfaces of said head end portion in superposed relation therewith; and bearing means interposed between the outermost said truncated conical member and the inner wall surface of said housing opposite the opening, said truncated conical members each having opposing parallel surfaces, the innermost said truncated conical member being formed in planes mismating with the diametric and truncated conical planes of said head end portions prior to assembly and preloading of the joint.

2. Structure as specified in claim 1 in which said bearing means includes at least one bearing member surrounding the outer truncated conical surface of the outermost said truncated conical member and bearing aaginst most said truncated conical member and bearing against an adjacent portion of the arcuate inner surface of said housing.

3. Structure as specified in claim 2 and a bearing surrounding said shank end portion and slidably contacting a portion of the arcuate inner surface of said housing adjacent the opening.

4. Structure as specified in claim 3 and a friction reducing sheath interposed between said shank end portion and the last named bearing.

5. Structure as specified in claim 2 and a friction reducing sheath interposed between said stud and the arcuate surface of said housing adjacent the opening.

6. Structure as specified in claim 1 and a spring interposed between the truncated end portions of said truncated conical members.

References Cited by the Examiner

UNITED STATES PATENTS 2,727,768   12/1955   Latzen.
2,999,710   9/1961   Latzen.

FOREIGN PATENTS 210,763   8/1960   Austria.

CARL W. TOMLIN, *Primary Examiner.*

A. V. KUNDRAT, *Assistant Examiner.*